United States Patent Office 3,425,270
Patented Feb. 4, 1969

3,425,270
TEST STAND FOR FUEL INJECTION PUMPS
Richard Hainz, Salzburg, Austria, assignor to
Friedmann & Maier, Salzburg, Austria
Filed Aug. 23, 1966, Ser. No. 574,349
Claims priority, application Austria, Aug. 24, 1965,
A 7,782/65
U.S. Cl. 73—119                                     1 Claim
Int. Cl. G01m 15/00

ABSTRACT OF THE DISCLOSURE

A test stand for fuel injection pumps in which a holder for measuring glasses is slidably mounted on a frame which in turn is slidably mounted on a support for a series of nozzles for movement parallel to such nozzles. The frame is defined by two spaced apart substantially parallel rails interconnected to provide a single structure with the holder being mounted on one of the rails and the other of the rails being mounted on the support.

---

Figure 1:
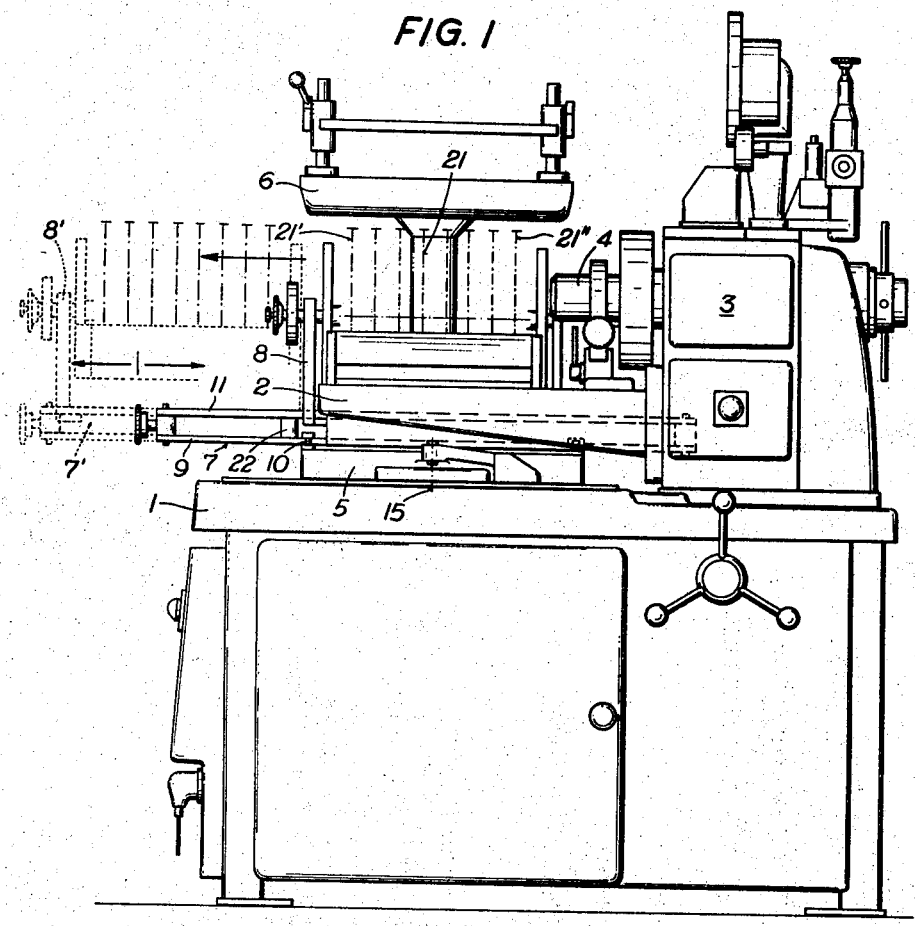

This invention relates to a test stand for fuel injection pumps.

It has already been proposed for a test stand for fuel injection pumps, an arrangement in which the measuring glass holder is slidably mounted in a frame, which in turn is slidably mounted in a support for the measuring glasses for a movement parallel to the series of nozzles. Such a test stand is shown and described in the Austrian patent specification No. 232,795. The embodiment of such a test stand entails the advantage that for the purpose of reading the liquid level of the measuring glasses, the measuring glass holder may be displaced from the region covered by the pump to be tested without the guide members provided for displacement of the support for the measuring glasses protruding beyond the test stand in a disturbing manner, when the measuring glass holder is in its operating position. This displacement of the measuring glass holder is so effected that the guide, i.e. the frame, along which the measuring glass holder may be slidably displaced, can also be displaced in the support for the measuring glasses. If this principle is to be put into effect, the guide members of the measuring glass holder disposed on the frame and the guide members of the support for the measuring glasses, in which the frame is guided, must embrace each other in the retracted position. A solution according to the above-mentioned Austrian patent, by which independence of the two guide members from each other is assured, resides in that the frame consists of two interconnected longitudinal guide members, with these longitudinal guide members on their outside being guided in the support for the measuring glasses and the measuring glass holder being guided between these two longitudinal guide members. These two longitudinal guide members, being arranged at different levels, on the one hand cause an increase of the overall height and, on the other hand, impair accessibility to the pump to be tested from the side of the support for the nozzles and measuring glasses.

It is an object of the present invention to avoid these disadvantages and to further improve the arrangement according to the above-mentioned construction. The invention essentially consists in that the guide track of the frame, along which the measuring glass holder may be displaced, and the guide track of the frame, by means of which said frame is slidably mounted in the support for the measuring glasses, are combined to one rail forming the frame. By reducing the frame to one single rail, the required overall height is lowered and accessibility to the pump to be tested from the side of the support for the nozzles and measuring glasses is facilitated. According to a preferred embodiment of the invention, each guide track is provided with at least two guide surfaces embraced by the guide members of the measuring glass holder and the guide members of the support for the measuring glasses, respectively, so that a perfect, safe guide is guaranteed. In a practical embodiment of the invention, this effect is achieved by giving the frame rail a double-T-cross-section.

Because each of the two guide members is reduced to one track only, an easy sliding movement is assured during displacement. In order to secure the measuring glass holder in different positions, the frame is appropriately provided with rests, which cooperate with spring elements of the measuring glass holder as well as with rests which cooperate with spring elements of the support for the measuring glasses. Thus, it is not only possible to arrest the measuring glass holder in its operating position and in its extended end position, but also precisely adjusted intermediate positions will become possible, so that pumps having a number of pump elements, which is only a fraction of the number of the nozzles and measuring glasses provided on the test stand, may be tested several times in different positions of the measuring glass holder, thereby giving the advantage that test results and liquid levels respectively, obtained from successive tests may be immediately compared to each other.

Figure 3:
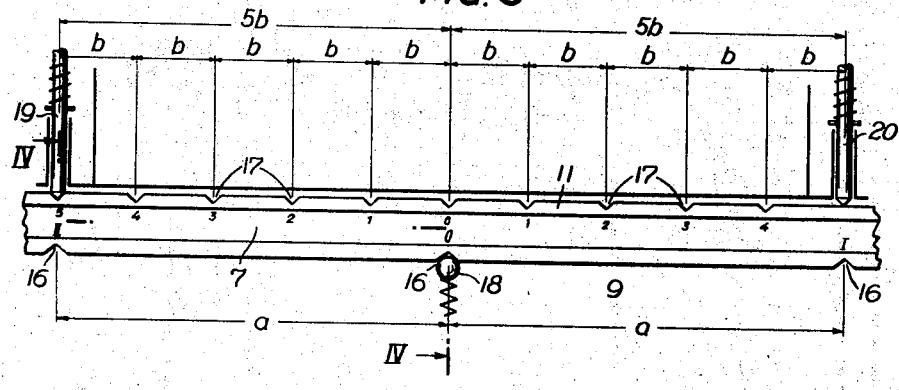
Figure 2:
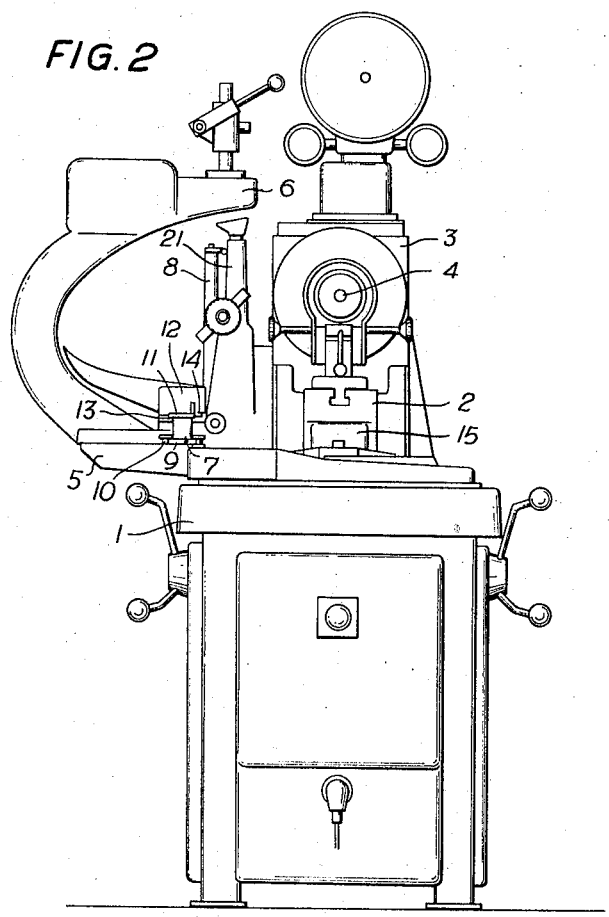
Figure 4:
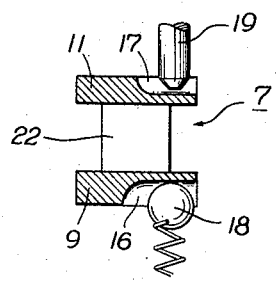

An illustrative embodiment of the invention is diagrammatically shown in the accompany drawings. FIGS. 1 and 2 show a test stand in side elevation and front elevation, respectively. FIGS. 3 and 4 diagrammatically depict a portion of the rail forming the frame, with FIG. 3 representing the side elevation and FIG. 4 a section along line IV—IV of FIG. 3.

In FIGS. 1 and 2, 1 is a test stand, 2 a bracket for the pump to be tested and 3 a headstock of the test stand with a protruding driving spindle 4. 5 is a support for the nozzles and measuring glasses, to which a nozzle holder 6 is rigidly mounted. To the support 5 for the measuring glasses a rail 7 constituting the frame is slidably mounted, and to which rail in turn a measuring glass holder 8 is slidably mounted.

As is shown in the drawings, the frame 7 has a double-T-cross-section and consists of two plate rails 9 and 11, which are interconnected by spaced cylindrical connecting members 22. The lower plate rail 9 is embraced by guide elements 10 of the support 5 for the measuring glasses. A bracket 12 of the measuring glass holder 8 rests upon the upper plate rail 11, and which bracket has a portion 13 embracing the plate rail 11. The measuring glass holder is protected against tilting by a projection 14 coacting with the plate rail 11.

In FIG. 1, the frame 7 is depicted in its middle position. It may be longitudinally displaced in both directions. The lefthand end position is indicated in dotted lines at 7' and to the right, the frame 7 may be extended by the same distance. On this frame, in turn, the measuring glass holder 8 may be displaced in both directions, with the lefthand end position again being indicated in dotted lines by numeral 8'. This displaceability in both directions on the one hand serves the purpose of enabling the measuring glass holder to be moved towards the headstock 3 and on the other hand permits the entire support 5 for the nozzles and measuring glasses to be displaced about an axis 15 from one side of the test stand to the other.

As is diagrammatically shown in FIGS. 3 and 4, the frame rail 7 is provided with rests. On the lower side, three rests 16 and on the upper side ten rests 17 are provided. The rests 16 on the lower side are designated in a scale-like manner by 0, I and II, and the rests on the upper side by 0 and 1 to 5. The rests 16 are engaged by a spring element 18 of the measuring glass holder. This spring element is depicted in the form of a ball. The rest 16 designated by 0 is engaged by the spring element when the frame rail 7 is in its intermediate position and the rests 16 designated by I and II, respectively, determine the lefthand and righthand extended end positions of the frame rail 7. Two spring elements of the measuring glass holder 8 defined index pins 19, 20 engage the rests 17. As is shown in the drawing, the distance between the two index pins 19, 20, which is designated by 2×5b, is greater than the region of the frame rail 7 on which the rests 17 are arranged so that only one index pin 19 or 20 may engage one rest 17 at the same time. This is of advantage for reasons of production.

The distance between the individual rests 17 is designated by b, and the distance between the rests 16 by a. The distance 2a is equal to the distance 2×5b.

The frame rail 7 will always be extended from the handling side towards the free side, i.e. for example with respect to FIG. 1, towards the left until the ball 16 being in the middle of the base of the support 5 for the measuring glasses engages the notch I. Thus, the frame rail 7 is displaced by the distance a. If the measuring glass holder is to be retracted into its intermediate position, it must be displaced in return by this distance (5×b=a). In the same direction it may be displaced by further 4b. The outermost lefthand measuring glass 21' of a series 21 of measuring glasses will then occupy the position of the first measuring glass 21". In this way the support for the measuring glasses may be gradually displaced by the distance b to the left, so that e.g. with a 1-cylinder pump eight measurings may be carried out successively. Subsequently the measurings may be optically examined. 2-cylinder pumps will be displaced after each measuring by 2b, etc.

If the support 5 for the nozzles and measuring glasses is turned to the other side of the test stand, displacement is carried out in the other direction in a similar way.

This invention is not to be confined to any strict conformity to the showings in the drawings but changes or modifications may be made therein so long as such changes or modifications mark no material departure from the spirit and scope of the appended claim.

What I claim is:

1. A test stand for fuel injection pumps, comprising a support for a series of nozzles, a frame slidably mounted on said support for movement parallel to said series of nozzles, and a measuring glass holder slidably mounted on said frame, said frame including two spaced apart substantially parallel rails and means interconnecting the rails, means slidably mounting one of said rails on said support, means slidably mounting said glass holder on the other of said rails, spring bias detent means operably related between one of said rails and said glass holder, and further spring bias detent means operably related between said support and the other of said rails, said detent means being adapted for engagement with said rails for arresting said holder in a desired position, and the distance between said further spring bias detent means and said other of said rail being a multiple of the distance between the spring bias detent means and said one rail.

References Cited

UNITED STATES PATENTS

| 3,264,868 | 8/1966 | Hainz. | |
| 2,670,028 | 2/1954 | Doty, et al. | 248—425 |
| 3,116,586 | 1/1964 | Ingham | 212—18 X |

FOREIGN PATENTS

| 232,795 | 8/1963 | Austria. |

RICHARD C. QUEISSER, *Primary Examiner.*

JERRY W. MYRACLE, *Assistant Examiner.*

U.S. Cl. X.R.

248—131